United States Patent Office 3,284,377
Patented Nov. 8, 1966

3,284,377
POLYURETHANE PLASTICS PREPARED FROM A NITROGEN CONTAINING POLYOL
Rudolf Merten and Günther Braun, Cologne-Flittard, and Hans-Joachim Hennig, Cologne-Stammheim, Germany, assignors to Farbenfabriken Bayer Aktiengesellschaft, Leverkusen, Germany, a German corporation
No Drawing. Filed Sept. 12, 1963, Ser. No. 308,347
Claims priority, application Germany, Sept. 12, 1962, F 37,794
6 Claims. (Cl. 260—2.5)

This invention relates to polyurethane plastics and to intermediates which are useful for the preparation of polyurethane plastics. More particularly, this invention is concerned with nitrogenous polymers which have improved properties for the preparation of polyurethane plastics.

It has been proposed heretofore to prepare nitrogen containing polyols. For example, it is well known to react ethylene diamine with propylene oxide to prepare a product having terminal hydroxyl groups. This product, when reacted with an organic polyisocyanate, especially in the presence of a blowing agent, yields highly desirable cellular polyurethane plastics. However, the heretofore known nitrogeneous polyols of this type have not been without their disadvantage is that they often have a relatively high viscosity. Another disadvantage is that unless relatively large amounts of alkylene oxide are added to the amino groups, they have a very high hydroxyl content which, in turn, takes a lot of organic polyisocyanate in order to have a completely cross-linked polymer. Still further, the tertiary nitrogen atom which results when the amino hydrogen reacts with the alkylene oxide has a strong accelerating effect on the reaction between the isocyanato group and the hydroxyl group. While this is an advantage in some cases, it is a disadvantage where it is desirable to have long casting times, particularly for cellular polyurethane plastics.

It is, therefore, an object of this invention to provide active hydrogen containing compounds which contain nitrogen and which avoid the disadvantages set forth above. Another object of the invention is to provide polyurethane plastics based on these active hydrogen containing compounds. Another object of the invention is to provide improved polyethers for the preparation of polyurethane plastics, which polyethers contain nitrogen. Still a further object of this invention is to provide for the preparation of polyurethane plastics which have improved resistance to hydrolysis. A further object of the invention is to provide celular polyurethane plastics based on nitrogen containing polyols which have improved physical properties. Another objects of the invention is to provide polyols suitable for the preparation of polyurethane plastics and containing nitrogen which are less viscous, light colored materials having a reduced tendency to accelerate the reaction between themselves and an organic polyisocyanate.

The foregoing objects and others which will become apparent from the following description are accomplished in accordance with the invention, generally speaking, by providing active hydrogen compounds and polyurethane plastics prepared therefrom, said active hydrogen containing compounds being prepared by reacting an ethylenicaly unsaturated compound with ammonia, hydrazine or an organic polyamine to prepare an initial product having at least two remaining amino hydrogen atoms and reacting some or all of the remaining amino hydrogen atoms with an alkylene oxide to prepare a polyol. In other words, this invention contemplates polyols and polyurethane plastics prepared therefrom. The polyols are prepared by reacting an ethylenically unsaturated compound which preferably has a molecular weight of about 28 to 250 with ammonia, hydrazine, or an organic polyamine. In this first stage of the process, 1 mol of ammonia, hydrazine or organic polyamine is reacted with n-2 mols of the ethylenically unsaturated compound, where $n$ is equal to at least 3 and corresponds to the number of hydrogen atoms bonded to nitrogen in the ammonia, hydrazine or organic polyamine. The initial product is then reacted with an alkylene oxide to prepare a polyol.

Any suitable ethylenically unsaturated compound which preferably has a molecular weight below about 200 may be used. A preferred type of ethylenically unsaturated compound is an alpha, beta-unsaturated nitrile which reacts with the ammonia, hydrazine or organic polyamine to yield a beta-cyano-alkyl which, in turn, reacts with an alkylene oxide to yield amino nitriles containing free hydroxyl groups. Other ethylenically unsaturated compounds which may be used include, for example, ethylene, propylene, 1-butylene, isobutylene, styrene, chlorostyrene, 1,4-divinyl benzene, alpha-vinyl pyridine, butadiene, isoprene, 2,3-dimethyl butadiene-1,3, chloroprene, cyclohexene, para-tolyl-vinyl sulphone, benzyl allyl sulphonate, butadiene sulphone, vinyl-methyl ketone, nitroethylene, omega-nitrostyrene, acrylic acid, methyl ester of acrylic acid, allyl alcohol, vinyl acetate, N-vinyl imidazole, the methyl ester of maleic acid, vinyl phosphonic acid and the like. As stated above, the preferred unsaturated compounds are the alpha, beta-unsaturated nitriles, including, for example, acrylonitrile, 1,4-dicyano-2-butene, cinnamic acid nitrile and the like; alpha, beta-unsaturated nitriles which are the nitriles of alpha, beta-unsaturated monocarboxylic and polycarboxylic acids. The alpha, beta-unsaturated nitriles have the advantageous affect in the final product of reducing the catalytic effect of the tertiary amino atoms by the introduction of the beta-cyano alkyl grouping.

In addition to ammonia, the hydrazines which have at least three hydrogen atoms bonded to hydrazine-nitrogen atoms and organic polyamines are useful in the present invention. Examples of hydrazines are N-methyl hydrazine, N-ethyl hydrazine, N-butyl hydrazine as well as unsubstituted hydrazine and the like. In general, the hydrazines may have the formula RHN—NH$_2$ wherein R is any suitable alkyl, aryl or heterocyclic radical, preferably having not more than 10 carbon atoms including, for example, methyl, ethyl, propyl, butyl, phenyl, chlorophenyl, pyridyl, and the like. Any suitable organic polyamine may be used provided that it has at least three hydrogen atoms bonded to amino nitrogen atoms including, aliphatic, araliphatic, aromatic and heterocyclic polyamines such as, for example, ethylene diamine, N-alkyl ethylene diamines such as N-methyl ethylene diamine, N-ethyl ethylene diamine and the like. Diethylene triamine, triethylene tetra-amine, tetra-ethylene pentaamine, 1,2- and 1,3-diamino propane, 1,4-diamino butane, 1,6-diamino hexane, diamines of higher dicarboxylic acids, preferably dimerized fatty acids, such as, the dimer of oleic acid, the dimer of linoleic acid and the like reacted with ethanol amine, propanol amine and the like. Polyamines prepared by adding acrylonitrile to polyhydric alcohols, such as ethylene glycol and polyhydric phenols such as cresol with subsequent hydrogenation; 1,2-, 1,3- and 1,4-xylylene diamine, 1,3-diamino-1-phenyl propane, 1,3-diamino-1,3-diphenyl propane, ortho-, meta- and para-phenylene diamines and hexahydrophenylene diamines; 2,4- and 2,6-toluylene diamine, 1,5-naphthylene diamine, 4,4'-diamino diphenyl methane, hydrogenated 4,4'-diamino dihpenyl methane, beta-amino ethyl piperazine and the like.

Any suitable alkylene oxide may be used for addition to the initial reaction product such as, for example, ethylene oxide, propylene oxide, 1,2-butylene oxide, styrene oxide, epihalohydrin such as epichlorohydrin or any other suitable epoxide preferably having from 2 to 10 carbon atoms.

The polyols of the invention may be prepared by combining the components in any suitable manner. The polyols are preferably prepared by reacting the amines containing n-basic nitrogen atoms in the molecule in a first stage with 0.1 to n-2 mols of an ethylenically unsaturated compound and preferably an alpha, beta-unsaturated nitrile per mol of amine. The $n$ is equal to at least 3 and corresponds to the number of basic nitrogen atoms in the molecule.

It is preferred to add the ethylenically unsaturated component to the amine component and it is preferred to carry out the addition at a temperature between about 0° C. and about 100° C. The reaction, especially between the amine and the alpha,beta-unsaturated nitrile is exothermic and it may be desirable in some cases to cool the reaction mixture, especially where aliphatic amines or hydrazine is the reacting component. Some combinations react more sluggishly. For example, combinations of aromatic amines or of methyl acrylo nitrile may require the addition of acid or alkaline catalysts such as, for example, sodium methylate, sodium carbonate, sodium hydroxide, potassium hydroxide, sulfuric acid, boron trifluoride and the like. Some of the reaction components are solid and need to be dissolved in a solvent such as aliphatic hydrocarbon, for example, hexane or heptane or an aromatic hydrocarbon such as benzene or even an alcohol such as ethyl alcohol or the like. Moreover, it is possible to use water since it is not harmful.

After the initial reaction product is prepared to yield the, for example, beta-cyano-alkyl compound, the further reaction with an alkylene oxide is preferably effected in a second stage. In this stage, it is preferred to use at least one mol of alkylene oxide for each basic nitrogen atom which is still present and to which is bonded at least one hydrogen atom. It is also possible, however, by using less than one mol of alkylene oxide, to obtain amino nitriles which have hydroxyl groups and, in addition, —NH— groups, the latter show an increased activity. It is most preferred to use at least two mols of alkylene oxide per mol of reaction product. The addition of the alkylene oxide is preferably carried out at a high temperature, i.e., about 100 to 140° C. and possibly under pressure. While the aliphatic amino groups may be hydroxy alkylated with the alkylene oxide in the absence of catalysts it is possible to use the alkaline or acid catalysts referred to above for amino groups which are less reactive, for example, those aromatic amines. The number of alkylene oxide molecules added can be varied considerably, but it is preferred to stop the addition while the hydroxyl number is still at least about 30. The preferred hydroxyl number range is from about 30 to about 750. In carrying out the process of the invention, it is not necessary to change from one reaction vessel to another, but it is possible to carry the reaction out in stages by way of the separate production of the amino nitrile, for example, beta-amino propionitrile or N,N'-bis-beta-cyano-ethyl ethylene diamine, and then add the alkylene oxide to the initial product.

The polyhydoxy amino nitriles thus obtained are useful particularly for the preparation of polyurethane plastics, including foams, coatings, elastomers, castings and the like. For the production of polyurethane plastics, the polyol is reacted with an organic polyisocyanate. In some cases, it is desirable to mix the polyol of this invention with an additional organic compound containing at least two active hydrogen containing groups as determined by the Zerewitinoff method Any suitable organic compound containing at least two active hydrogen containing groups as determined by the Zerewitinoff method, said groups being reactive with an isocyanate group, may be reacted with an organic polyisocyanate in accordance with the process of the present invention. The active hydrogen atoms are usually attached to oxygen, nitrogen or sulphur atoms. Thus, suitable active hydrogen containing groups as determined by the Zerewitinoff method which are reactive with an isocyanate group include —OH, —NH$_2$, —COOH, —SH and the like. Examples of suitable types of organic compounds containing at least two active hydrogen containing groups which are reactive with an isocyanate group are hydroxyl polyesters, polyhydric polyalkylene ethers, polyhydric polythioethers, polyacetals, aliphatic polyols, including alkane, alkene and alkyne diols, triols, tetrols and the like, aliphatic thiols including alkane, alkene and alkyne thiols having two or more —SH groups; polyamines including both aromatic, aliphatic and heterocyclic diamines, triamines, tetramines and the like; as well as mixtures thereof. Of course, compounds which contain two or more different groups within the above-defined classes may also be used in accordance with the process of the present invention such as, for example, amino alcohols which contain an amino group and an hydroxyl group, amino alcohols which contain two amino groups and one hydroxyl group and the like. Also, compounds may be used which contain one —SH group and one —OH group or two —OH groups and one —SH group as well as those which contain an amino group and an —SH group and the like.

The molecular weight of the organic compound containing at least two active hydrogen containing groups is not critical. Preferably, however, at least one of the organic compounds containing at least two active hydrogen containing groups which is used in the production of the polyurethane plastic has a molecular weight of at least about 200 and preferably between about 500 and about 5000 with an hydroxyl number within the range of from about 25 to about 800 and acid numbers, where applicable, below about 5. A satisfactory upper limit for the molecular weight of the organic compound containing at least two active hydrogen containing groups is about 10,000 but this limitation is not critical so long as satisfactory mixing of the organic compound containing at least two active hydrogen containing groups with the organic polyisocyanate can be obtained. In addition to the high molecular weight organic compound containing at least two active hydrogen containing groups, it is desirable to use an organic compound of this type having a molecular weight below about 750 and preferably below about 500. Aliphatic diols and triols are most preferred for this purpose.

Any suitable hydroxyl polyester may be used such as are obtained, for example, from polycarboxylic acids and polyhydric alcohols. Any suitable polycarboxylic acid may be used such as, for example, oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, alpha-hydromuconic acid, beta-hydromuconic acid, alpha-butyl-alpha-ethyl-glutaric acid, alpha-beta-diethyl-succinic acid, trimellitic acid, trimesic acid, mellophanic acid, prehnitic acid, isophthalic acid, terephthalic acid, hemimellitic acid, benzenepentacarboxylic acid, 1,4-cyclohexanedicarboxylic acid, 3,4,9,10-perylenetetracarboxylic acid and the like. Any suitable polyhydric alcohol may be used such as, for example, ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerine, trimethyol propane, 1,3,6-hexane triol, triethanolamine, pentaerythritol, sorbitol and the like.

Any suitable polyhydric polyalkylene ether may be used such as, for example, the condensation product of an alkylene oxide or of an alkylene oxide with a polyhydric alcohol. Any suitable polyhydric alcohol may be used such as those disclosed above for use in the preparation of the hydroxyl polyesters. Any suitable alkylene oxide may be used such as, for example, ethylene oxide, propylene oxide, butylene oxide, amylene oxide and the like. Of course, the polyhydric polyalkylene ethers can be prepared from other starting materials such as, for example, tetrahydrofuran, epihalohydrins such as, for example, epichlorohydrin and the like as well as aralkylene oxides such as, for example, styrene oxide and the like. The polyhydric polyalkylene ethers may have either primary or secondary hydroxyl groups and preferably are polyhydric polyalkylene ethers prepared from alkylene oxides having from two to five carbon atoms such as, for example, polyethylene ether glycols, polypropylene ether glycols, polybutylene ether glycols and the like. It is often advantageous to employ some trihydric or higher polyhydric alcohol such as glycerine, trimethylol propane, pentaerythritol and the like in the preparation of the polyhydric polyalkylene ethers so that some branching exists in the product. Generally speaking, it is advantageous to condense from about 5 to about 30 mols of alkylene oxide per functional group of the trihydric or higher polyhydric alcohol. The polyhydric polyalkylene ethers may be prepared by any known process such as, for example, the process disclosed by Wurtz in 1859 and in Encyclopedia of Chemical Technology, volume 7, pp. 257–262, published by Interscience Publishers, Inc. (1951) or in U.S. Patent 1,922,459.

Any suitable polyhydric polythioether may be used such as, for example, the condensation product of thiodiglycol or the reaction product of a polyhydric alcohol such as is disclosed above for the preparation of the hydroxyl polyesters with any other suitable thioether glycol. Other suitable polyhydric polythioethers are disclosed in U.S. Patents 2,862,972 and 2,900,368.

The hydroxyl polyester may also be a polyester amide such as is obtained, for example, by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl polyester with only a portion of the components being a diamine such as ethylene diamine and the like.

Any suitable polyacetal may be used, such as, for example, the reaction product of formaldehyde or other suitable aldehyde with a polyhydric alcohol such as those disclosed above for use in the preparation of the hydroxyl polyesters.

Any suitable aliphatic polyol may be used such as, for example, alkane diols such as, for example, ethylene glycol, 1,3-propylene glycol, 1,2-propylene glycol, 1,4-butylene glycol, 1,3-butylene glycol, 1,5-pentane diol, 1,4-butane diol, 1,3-pentane diol, 1,6-hexane diol, 1,7-heptane diol, 2,2-dimethyl-1,3-propane diol, 1,8-octane diol and the like including 1,20-eicosane diol and the like; alkene diols such as, for example, 1-butene-1,4-diol, 1,3-butadiene-1,4-diol, 2-pentene-1,5-diol, 2-hexene-1,6-diol, 2-heptane-1,7-diol and the like; alkyne diols such as, for example, 2-butyne-1,4-diol, 1,5-hexadiyne-1,6-diol and the like; alkane triols such as, for example, 1,3,6-hexanetriol, 1,3,7-heptane triol, 1,4-8-octane triols, 1,6,1-dodecane triol and the like; alkene triols such as, 1-hexene-1,3,6-triol and the like; alkyne triols such as, 2-hexyne-1,3,6-triol and the like; alkyne triols such as 2-hexyne-1,3,6-triol and the like; alkane tetrols such as, for example, 1,2,5,6-hexane tetrol and the like; alkyne tetrols such as, for example, 4-octyne-1,2,7,8-tetrol and the like; alkene tetrols such as, for example, 3-heptane-1,2,6,7-tetrol and the like.

Any suitable aliphatic thiol including alkane thiols containing two or more —SH groups may be used such as, for example, 1,2-ethane dithiol, 1,2-propane dithiol, 1,3-propane dithio, 1,6-hexane dithiol, 1,3,6-hexane trithiol and the like; alkene thiols such as, for example, 2-butene-1, 4-dithiol and the like; alkyne thiols such as, for example, 3-hexyne-1,6-dithiol and the like.

Any suitable polyamine may be used for example, aromatic polyamines such as, for example, p-amino aniline, 1,5-diamino naphthalene, 2,4-diamino toluylene, 1,3,5-benzene triamine, 1,2,3-benzene triamine, 1,4,5,8-naphthalene tetramine and the like; aliphatic polyamines such as, for example, ethylene diamine, 1,3-propylene diamine, 1,4-butylene diamine, 1,3-butylene diamine, diethyl triamine, triethylene tetramine, 1,3,6-hexane triamine, 1,3,5,7-heptane tetramine and the like; heterocyclic polyamines such as, for example, 2,6-diamino pyridine, 2,4-diamino 5-aminomethyl pyrimidine, 2,5-diamino-1,3,4-thiadiazol and the like.

Other alcohol compounds which do not necessarily fit within any of the previously set forth classes of compounds and which nevertheless contain active hydrogen containing groups which are quite suitable for the production of the polyurethane plastics of the present invention are pentaerythritol, sorbitol, triethanolamine, mannitol, N,N,N',N',-tetrakis(2-hydroxy propyl)ethylene diamine, as well as compounds of any of the classes set forth which are substituted with halogen such as, for example, chloro, iodo, bromo and the like; nitro; alkoxy, such as, for example, methoxy, ethoxy, propoxy, butoxy and the like; carboalkoxy such as, for example, carbomethoxy, carbethoxy and the like; dialkyl amino such as, for example, dimethyl amino, diethyl amino, dipropyl amino, methylethyl amino and the like; mercapto, carbonyl, thiocarbonyl, phosphoryl, phosphate and the like.

It is also possible to use polyphosphites or alkoxylated phosphoric acids such as, for example, those disclosed in U.S. Patents 3,009,939 and 3,061,625.

Any suitable organic polyisocyanate may be used. The polyisocyanates can be aliphatic and aromatic polyvalent isocyanates e.g. alkylene diisocyanates, such as tetramethylene and hexamethylene diisocyanates, arylene diisocyanate and their alkylation products such as phenylene diisocyanate, naphthylene diisocyanate, diphenylmethane diisocyanate, toluylene diisocyanates, di- and tri-isopropylbenzene diisocyanates and triphenylmethane triisocyanate, p-isocyanato-phenyl-thiophosphoric acid triesters, p-isocyanato-phenyl-phosphoric acid triesters, aralkyl diisocyanates such as 1-(isocyanatophenyl)-ethylisocyanate or the xylylene diisocyanates, as well as polyisocyanates substituted by various substituents such as OR, NO$_2$, Cl, and also polyisocyanates modified with less than equivalent quantities of polyhydroxyl compounds (such as trimethylol propane, hexanetriol, glycerine and butanediol). Polyisocyanates masked with phenols or bisulphite, acetal-modified isocyanates and also polymerized isocyanates with isocyanurate rings are also mentioned as examples.

Any suitable crude isocyanate may be used such as, for example crude toluylene diisocyanate obtained by the phosgenation of a mixture of toluylene diamines or crude diphenyl methane isocyanates obtained by the phosgenation of crude diphenyl methane diamine. Crude diphenyl methane diamine is the reaction product of aniline and formaldehyde in the presence of HCl and contains some tri- and higher polyamines. A preferred unrefined or crude isocyanate is one having from about 26 to about 33 percent free —NCO and an amine equivalent of about 120 to about 150, such as, for example, a product having about 32 percent free —NCO and an amine equivalent of about 140. A specified crude isocyanate suitable for use in accordance with the present invention may be obtained by reacting about 60 parts of aniline with about 25 parts of formaldehyde (37 percent aqueous) and about 74 parts of HCl (30 percent aqueous) at a temperature of about 90° C. to about 100° C. for about 1.5 to about 2 hours and then reacting this product with NaOH and separating out the crude amine. About 100 parts of phosgene are then reacted with the crude amine until a product having an amine equivalent of about 135 and containing about 31 percent free —NCO is obtained. The free excess phosgene and substantially all of the solvents used, if any, are then removed. When toluylene diisocyanates, for example, are produced by conventional phosgenation of the corresponding diamines, a product containing about 90 percent 2,4- and 2,6-toluylene diisocyanate and the balance a crude residue of imidazoles and the like resulting in the phosgenation is obtained from the phosgenator. This product may also be used. It is preferred to phogenate a mixture of ortho- and para-toluylene diamines. A specific product is the undistilled reaction mixture obtained by the phosgenation of 80 percent 2,4- and 20 percent 2,6-toluylene diamine containing 90 percent of a mixture of about 80 percent, 2,4- and 20 percent 2,6-toluylene diisocyanate and the balance polymers incapable of accurate analysis.

The commercially available crude 4,4'-diphenyl methane diisocyanate having an assay of about 90 percent maximum, an amine equivalent of 141 maximum, about 0.04 to about 0.4 percent by weight hydrolyzable chloride, about 0.1 to about 0.6 percent by weight total chloride and having a flash point of about 430° F. may be used. As pointed out above, when toluylene diisocyanate for example, is produced by conventional phosgenation of the corresponding diamine, a product containing about 90 percent 2,4- and 2,6-toluylene diisocyanate is obtained from the phosgenator. Of course, the product from the phosgenator is subjected to distillation to remove the solvent so that a product having 90 percent 2,4- and 2,6-toluylene diisocyanate is obtained. The initial product from the phosgenator in most cases contains about 80 percent by weight of solvent. The 2,4- and 2,6-toluylene diisocyanate may be mixed with any suitable amount of the residue obtained if the isocyanate is refined and then reconstituted. In this event, it is preferred to have at least 50 percent of the refined isocyanate present. The crude polyisocyanates disclosed in Canadian Patent 665,495 are suitable.

The polyol of this invention is preferably used in the preparation of cellular polyurethane plastics by reaction thereof either alone or in admixture with another active hydrogen containing compound with an organic polyisocyanate in the presence of a blowing agent. Suitable processes for the preparation of cellular polyurethane plastics are disclosed in U.S. Reissue Patent 24,514 together with suitable machinery to be used in conjunction therewith. When water is added as the blowing agent, corresponding quantities of excess isocyanate to react with the water and produce carbon dioxide may be used. It is also possible to proceed with the preparation of the polyurethane plastics by a prepolymer technique wherein an excess of organic polyisocyanate is reacted in a first step with the polyol of the present invention to prepare a prepolymer having free —NCO groups which is then reacted in a second step with water to prepare a foam. Alternately, the components may be reacted in a single working step. Furthermore, instead of water, low boiling hydrocarbons such as pentane, hexane, heptane, pentene, heptene and the like; azo compounds, halogenated hydrocarbons such as, dichloro difluoromethane, trichlorofluoromethane, dichlorodifluoromethane, vinylidene chloride and the like may be used as blowing agents. It is often advantageous in the production of cellular polyurethane plastics to include other additives in the reaction mixture such as, for example, emulsifiers, foam stabilizers, coloring agents, fillers and the like. It is particularly advantageous to employ an emulsifier such as, for example, sulphonated castor oil and/or a foam stabilizer such as a silicone oil such as, for example, a polydimethyl siloxane or an alkyl silane polyoxyalkylene block copolymer. The latter type of silicone oil is disclosed in U.S. Patent 2,834,748. Where polyhydric polyalkylene ethers are included in the reaction mixture to prepare a cellular polyurethane plastic, it is preferred to employ a silicone oil of the above patent within the scope of the formula

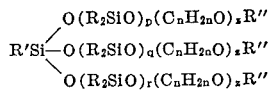

herein R, R' and R" are alkyl radicals having 1 to 4 carbon atoms; $p$, $q$ and $r$ each have a value of from 4 to 8 and $(C_nH_{2n}O)_z$ is a mixed polyoxyethylene oxypropylene group containing from 15 to 19 oxyethylene units and from 11 to 15 oxypropylene units with z equal to from about 26 to about 34. Most preferred is a compound having the formula

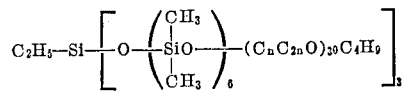

wherein $(C_nH_{2n}O)$ is a mixed polyoxyethylene and oxypropylene block copolymer containing about 17 oxyethylene units and about 13 oxypropylene units.

The polyols of the invention may also be used for the production of coating compositions. In this case, the polyol is reacted with the organic polyisocyanate in an inert organic solvent therefor such as, for example, dimethyl formamide, the diethyl ether of diethylene glycol, benzene, xylene, benzine, butylacetate, ethyl acetate, glycol monomethyl ether acetate or the like.

It is also possible to use the polyols of the invention in the preparation of elastomeric products which are nonporous, for example, by reacting the polyol with an excess of an organic polyisocyanate in a first step to prepare an isocyanato-terminated prepolymer under anhydrous conditions. This prepolymer is then reacted in a second step with a chain extending agent such as, for example, 1,4-butane diol, 1,3-butane diol, the bis-beta-hydroxy ethyl ether of hydroquinone, water or the like by mixing the crosslinking agent with the prepolymer and casting the resulting mixture in a mold.

Since the basicity and catalytic activity of the poly-(hydroxyalkyl)-hydrazines is only slight, tertiary amines can be employed as a catalyst so that the reaction between the isocyanate groups and the hydroxy groups on the poly-(hydroxyalkyl)-hydrazines will proceed at the desired speed, such as, for example dimethyl benzyl-amine, dimethylstearylamine,
permethylated diethylene triamine,
N-methyl-N'-dimethylaminoethylpiperazine,
N,N'-endoethylene piperazine,
N-alkyl morpholines;
tertiary aminoethers such as, for example, 1-alkoxy-3-dialkylamino-propane, tertiary amines with ester groups, salts of tertiary amines, especially with organic acids such as, for example, oleic acid, benzoic acid and the like, dibutyl tin dilaurate, dibutyl tin di-2-ethyl hexoate, dibutyl tin bis (dimethylamino caproate), stannous octoate, lead naphthenate, ferric acetylacetonate, mixtures thereof and any other catalyst which will promote the reaction between isocyanate groups and active hydrogen atoms as determined by the Zerewitinoff method such as those disclosed in "Catalysis of the Isocyanate-Hydroxyl Reaction," J. W. Britain and P. G. Gemeinhardt, Journal of Applied Polymer Science, volume IV, issue No. 11, pages 207–211 (1960).

The polyurethane plastics of the invention are useful where polyurethanes have been used heretofore. For example, the foams are useful for cushions and especially rigid foam is useful for both sound and thermal insulation in, for example, the walls of buildings. The coatings may be used to coat wood or metals such as steel and the like.

The elastomers are useful, for example, for the production of tires or for molded items such as gear wheels or the like.

The invention is further illustrated by the following examples in which parts are by weight unless otherwise specified.

PRODUCTION OF THE POLYHYDROXYL COMPOUNDS AS STARTING MATERIAL

*A-1—A-9.*—The amine is present initially and then the nitrile is so introduced dropwise at about 30 to 70° C. that the temperature does not exceed about 70° C., the mixture is heated to about 125° C. and then the alkylene oxide is introduced or added dropwise at about 125±5° C. After completing the addition of the alkylene oxide, the temperature is kept for about one hour at about 120° C. and after removing volatile constituents, the mixture is kept at about 80° C. for about one hour at about 12 mm. Hg. The yield is quantitative.

Hot-bending strength, ° C. _____ 125
Water absorption, percent _____ 3

*Example 2*

About 30 parts of A-2 are thoroughly mixed with about 70 parts of a polyester (OH number about 380) prepared from adipic acid, phthalic acid anhydride, oleic acid and trimethylol propane and about 0.5 part of polysiloxane-polyalkylene glycol ester. After adding a solution of about 30 parts of trichlorofluoromethane in about 105 parts of diphenylmethane-4,4'-diisocyanate (about 90%), the mixture starts to foam and a tough hard foam material with the following mechanical properties is obtained:

Weight per unit volume, kg./m.$^3$ _____ 32
Compressive strength, kg./cm.$^2$ _____ 2.7
Impact toughness, kg./cm. _____ 0.4
Hot-bending strength, ° C. _____ 120
Water absorption, percent _____ 3

|  | Parts of Amine | Parts of Nitrile | Parts of Alkylene Oxide | Percent OH | Acid No. | Viscosity, cp./25° C. |
|---|---|---|---|---|---|---|
| A1 | 120 ethylene diamine | 212 acrylonitrile | 225 propylene oxide | 12.8 | 0.1 | 7,000 |
| A2 | ----do---- | 106 acrylonitrile | 336 propylene oxide | 17.2 | 0.2 | 3,000 |
| A3 | 60 ethylene diamine | 80 acrylonitrile | 140 propylene oxide | 14.7 | 0.3 | 3,460 |
| A4 | 206 diethylene triamine | 212 acrylonitrile | 340 propylene oxide | 13.4 | 0.5 | 23,400 |
| A5 | 292 triethylene tetramine | ----do---- | 460 propylene oxide | 13.0 | 0.7 | 18,000 |
| A6 | 380 tetraethylene pentamine | ----do---- | 580 propylene oxide | 13.8 | 0.7 | |
| A7 | 232 hexamethylene diamine | 160 acrylonitrile | 295 propylene oxide | 12.9 | 0.0 | 3,000 |
| A8 | 252 1,3-bis-(gamma-aminopropoxy)-2,2-dimethyl-propane, techn. Amine-equiv. 126. | 53 acrylonitrile | 175 propylene oxide | 13.3 | 0.0 | 3,100 |
| A9 | 120 ethylene diamine | 106 acrylonitrile | 264 ethylene oxide | 22.5 | 0.0 | |
| A11 | ----do---- [1] | 130 methacrylonitrile | 350 propylene oxide | 20.4 | 0.0 | 59,000 |
| A12 | 245 toluylene-(2,4) diamine [2] | 106 acrylonitrile | 540 propylene oxide | 15.0 | 0.0 | >50,000 |

[1] 6 parts of sodium methylate used as catalyst.
[2] 10 parts of sodium methylate used as catalyst.

*A-10.*—About 159 grams (about 3 mols of acrylonitrile are added over a period of about 30 minutes to about 150 grams (about 3 mols) of hydrazine-hydrate at about 50–80° C. and, after the reaction has subsided, about 542 grams (about 9.35 mols) of propylene oxide are added at about 100° C., this taking about 10 hours. After distilling off the water under a water-jet vacuum up to about 80° C., an oily liquid with a viscosity of about 50,800 cp./25° C. is obtained. The hydroxyl number is about 723.

*A-13.*—About 562 parts of polyhydroxyl compound A-2 are transformed at about 60° C./12 mm. Hg with about 5 parts of sodium methylate into the salt and then about another 510 parts of propylene oxide are added at about 120° C. About 1056 parts of a polyether with an OH content of about 13.1% and a viscosity of about 1000 cp./20° C. are obtained.

*A-14.*—In a manner analogous to A-13 and using about 190 parts of polyhydroxyl compound A, about 2.5 parts of sodium methylate and about 1170 parts of propylene oxide, there are obtained about 1285 parts of a polyether with about 4.5% OH, acid number about 0.7 and a viscosity of about 1330 cp./20° C.

*Example 1*

About 70 parts of A-1 are thoroughly stirred with about 30 parts of a propoxylated trimethylol propane (OH number about 380), about 6 parts of sodium-castor oil sulphate (about 50% water) and about 0.3 part of polysiloxane-polyalkylene glycol ester. After adding about 145 parts of diphenylmethane-4,4'-diisocyanate (about 90%), the mixture is introduced into molds in which there is formed a fine-pored hard foam material with the following physical properties:

Weight per unit volume, kg./m.$^3$ _____ 45
Compressive strength, kg./cm.$^2$ _____ 3.2
Impact toughness, kg./cm. _____ 0.3

*Example 3*

About 30 parts of A-4 are stirred with about 70 parts of a propoxylated trimethylolpropane (OH number about 380), about 1 part of permethylated aminoethyl piperazine and about 0.5 part of polysiloxane-polyalkylene glycol ester. After mixing in a solution of about 30 parts of trichlorofluoromethane in about 96 parts of diphenylmethane-4,4'-diisocyanate (about 90%), a fine-pored foam material with the following physical properties is obtained:

Weight per unit volume, kg./m.$^3$ _____ 30
Compressive strength, kg./cm.$^2$ _____ 2.1
Impact toughness, kg./cm. _____ 0.8
Hot-bending strength, ° C. _____ 105
Water absorption, percent _____ 3

*Example 4*

About 30 parts of A-5 are thoroughly mixed with about 70 parts of a propoxylated trimethylol propane (OH number about 380), about 6 parts of sodium-caster oil sulphate (about 50% water) and about 0.3 part of polysiloxane-polyalkylene glycol ester. After incorporating about 141 parts of diphenylmethane-4,4'-diisocyanate (about 90%) by stirring, the mixture is introduced into molds, in which a fine-pored foam material with the following properties is formed:

Weight per volume, kg./m.$^3$ _____ 38
Compressive strength, kg./cm.$^2$ _____ 1.5
Impact toughness, kg./cm. _____ 0.3
Hot-bending strength, ° C. _____ 120
Water absorption, percent _____ 2.5

*Example 5*

About 30 parts of A-6 are thoroughly mixed with about 70 parts of propoxylated trimethylolpropane (OH number about 380), about 0.5 part of polysiloxane polyalkylene glycol ester and about 30 parts of trichlorofluoromethane. After adding about 96 parts of diphenylmethane-4,4'-diisocyanate (about 90%), the mixture starts to foam and a fine-pored hard foam material which has the following physical properties is obtained:

Weight per unit volume, kg./m.³ _____ 31
Compressive strength, kg./cm.² _____ 0.7
Impact toughness, kg./cm. _____ 0.4
Hot bending strength, ° C _____ 95
Water absorption, percent _____ 2

*Example 6*

About 50 parts of A-7 are thoroughly stirred with about 50 parts of a polyester (OH number about 380) prepared from adipic acid, phthalic acid anhydride, oleic acid and trimethylol propane, about 0.3 part of polysiloxane-polyalkylene glycol ester and about 6 parts of sodium-caster oil sulphate (about 50% water). After adding about 143 parts of diphenylmethane-4,4'-diisocyanate (about 90%), the mixture starts to foam and a hard foam material which has the following mechanical properties is obtained:

Weight per unit volume, kg./m.³ _____ 41
Compressive strength, kg./cm.² _____ 2.8
Impact toughness, kg./cm. _____ 0.2
Hot-bending strength, ° C. _____ 120
Water absorption, percent _____ 1.5

*Example 7*

About 70 parts of A-8 are thoroughly mixed with about 30 parts of propoxylated trimethylolpropane (OH number about 380), about 0.3 part of polysiloxane-polyalkylene glycol ester and about 6 parts of sodium-caster oil sulphate. After adding about 147 parts of diphenylmethane-4,4'-diisocyanate (about 90%), a tough foam material is obtained which has the following physical properties:

Weight per unit volume, kg./m.³ _____ 48
Compressive strength, kg./cm.² _____ 3.2
Impact toughness, kg./cm. _____ 0.3
Hot-bending strength, ° C. _____ 125
Water absorption, percent _____ 3

*Example 8*

About 10 parts of A-9 are thoroughly mixed with about 90 parts of a polyester (OH number about 380) prepared from adipic acid, phthalic acid anhydride, oleic acid and trimethylol propane, about 1 part of permethylated aminoethylpiperazine, about 0.3 part of polysiloxane-polyalkylene glycol ester and about 6 parts of sodium-castor oil sulphate (about 50% water). After adding about 147 parts of diphenylmethane-4,4'-diisocyanate (about 90%) the mixture starts to foam and a fine-pored hard foam material which has the following physical properties is obtained:

Weight per unit volume, kg./m.³ _____ 36
Compressive strength, kg./cm.² _____ 2
Impact toughness, kg./cm. _____ 0.3
Hot-bending strength, ° C. _____ 115
Water absorption, percent _____ 4

*Example 9*

About 30 parts of A-13 are thoroughly mixed with about 70 parts of propoxylated trimethylolpropane (OH number about 380), about 2-parts of ethylmorpholine, about 0.5 part of polysiloxane-polyalkylene glycol ester and about 30 parts of trichlorofluoromethane. After adding about 98 parts of diphenylmethane-4,4'-diisocyanate (about 99%), a fine-pored hard foam material which has the following mechanical properties is obtained:

Weight per unit volume, kg./m.³ _____ 32
Compressive strength, kg./cm.² _____ 2.2
Impact toughness, kg./cm. _____ 0.3
Hot bending strength, ° C. _____ 105
Water absorption, percent _____ 2

*Example 10*

About 30 parts of A-3 are thoroughly mixed with about 20 parts of a polyester of adipic acid, phthalic acid anhydride, oleic acid and trimethylol propane (hydroxyl number about 380), about 50 parts of propoxylated trimethylol propane (hydroxyl number about 380), about 2 parts of permethylated aminoethyl piperazine and about 0.5 part of polysiloxanepolyalkylene glycol ester. After adding a solution of about 50 parts of trichlorofluoromethane in 99 parts of diphenylmethane-4,4'-diisocyanate (about 90%), a fine-pored hard foam material which has the following physical properties is obtained:

Weight per unit volume, kg./m.³ _____ 22
Compressive strength, kg./cm.² _____ 1
Impact toughness, kg./cm. _____ 0.3
Hot bending strength, ° C. _____ 85
Water absorption, percent _____ 3

*Example 11*

About 30 parts of A-10 are thoroughly mixed with about 70 parts of a polyester (OH number about 380), prepared from adipic acid, phthalic acid anhydride, oleic acid and trimethylol propane, about 1 part of ethyl morpholine and about 0.5 part of polysiloxane-polyalkylene glycol ester. After adding a solution of about 30 parts of trichlorofluoromethane in about 116 parts of diphenylmethane-4,4'-diisocyanate (about 90%), a fine-pored foam material which has the following physical properties is obtained:

Weight per unit volume, kg./m.³ _____ 32
Compressive strength, kg./cm.² _____ 2.8
Impact toughness, kg./cm. _____ 0.4
Hot bending strength, ° C. _____ 140
Water absorption, percent _____ 1.8

*Example 12*

About 20 parts of A-11 are thoroughly mixed with about 80 parts of propoxylated trimethylol propane (hydroxyl number about 380), about 2 parts of dimethylbenzylamine, about 0.3 part of polysiloxane-polyalkylene glycol ester and about 6 parts of sodium-castor oil sulphate (about 50% water). After incorporating about 152 parts of diphenylmethane-4,4'-diisocyanate (about 90%) by stirring, the mixture starts to foam and a fine-pored hard foam material which has the following properties is obtained:

Weight per unit volume, kg./m.³ _____ 40
Compressive strength, kg./cm.² _____ 2.6
Impact toughness, kg./cm. _____ 0.4
Hot bending strength, ° C. _____ 135
Water absorption, percent _____ 2

*Example 13*

About 30 parts of A-12 are thoroughly mixed with about 70 parts of a polyester (OH number about 380) prepared from adipic acid, phthalic acid anhydride, oleic acid and trimethylolpropane, about 0.3 part of polysiloxane-polyalkylene glycol ester and about 6 parts of polysiloxane-polyalkylene glycol ester and about 6 parts of sodium-castor oil sulphate (about 50% water). After about 146 parts of diphenylmethane-4,4'-diisocyanate (about 90%) have been incorporated by stirring, a tough hard foam material which has the following properties is obtained:

Weight per unit, volume, kg./m.³ _____ 38
Compressive strength, kg./cm.² _____ 2.1
Impact toughness, kg./cm. _____ 0.4
Hot bending strength, ° C. _____ 128
Water absorption, percent _____ 3

*Example 14*

About 50 parts of A-14 are thoroughly mixed with about 50 parts of a polyester of adipic acid, phthalic acid anhydride, oleic acid and trimethylol propane (hydroxyl number about 380), about 2 parts of ethyl morpholine, about 0.3 part of polysiloxane-polyalkylene glycol ester and about 6 parts of sodium-castor oil sulphate (about 50% water). After adding about 110 parts of diphenylmethane-4,4′-diisocyanate (about 90%), a tough hard foam material which has the following mechanical properties is obtained:

| | |
|---|---|
| Water per unit, volume, kg./m.³ | 38 |
| Compressive strength, kg./cm.² | 2.1 |
| Impact toughness, kg./cm. | 0.3 |
| Hot bending strength, ° C. | 125 |
| Water absorption, percent | 2.5 |

PRODUCTION OF THE POLYHYDROXYL COMPOUNDS AS STARTING MATERIAL

A. About 120 parts of ethylene diamine are mixed at about 70° C. slowly with about 344 parts of methyl acrylate. The temperature is brought in about four hours to about 120° C. and during this time about 240 parts of propylene oxide are added dropwise. Volatile fractions are thereafter removed at about 80° C./12 mm. Hg. About 614 parts of polyhydroxyl compound with about 8.7% OH, acid number about 0.4, viscosity, about 2500 cp./25°, are left as residue.

B. About 2 parts of sodium are added to about 60 parts of anhydrous ethylene diamine and about 104 parts of styrene are added dropwise within about one hour at about 120° C. The mixture is heated under reflux for about 6 hours and then about 336 parts of propylene oxide are added dropwise at about 100–120° C. in about four hours. The temperature is kept for another hour at about 120° C., the added sodium is then neutralized with the stoichiometric quantity of about 20% sulphuric acid, the mixture is concentrated at about 80° C./12 mm. Hg and filtered while hot through a pressure filter. A theoretical yield of the polyhydroxyl compound is obtained with about 11.1% OH, about 5.4% N, acid number about 4.3, viscosity about 4730 cp./25°.

C. In the manner described in connection with the production of the starting material B, about 60 parts of ethylene diamine, about 103 parts of 2-vinyl pyridine and about 504 parts of propylene oxide are reacted in the presence of 2 parts of sodium. There are obtained about 669 parts of polyhydroxyl compound with about 9.7% OH, about 5.6% N, acid number about 1.3, viscosity about 6150 cp./25°.

D. About 98 parts of maleic acid anhydride are added to about 154 parts of about 78% aqueous ethylene diamine at about 70° C. and then the mixture is concentraed at about 80° C. in vacuo. About 168 parts of propylene oxide are then introduced dropwise at about 100–110° C. into the adduct, which is brittle at room temperature. After brief vacuum treatment of the adduct, there are obtained about 322 parts of a viscous polyhydroxyl compound with about 16.8% OH.

Example 15

About 70.0 parts of polyhydroxyl compound A are thoroughly mixed with about 30.0 parts of a polyester of phthalic acid anhydride, adipic acid, oleic acid and trimethylol propane (OH number about 380), about 0.3 part of polysiloxane polyalkylene glycol ester and about 6.0 parts of sodium-castor oil sulphate (about 50% water). After adding about 121.0 parts of diphenylmethane-4,4′-diisocyanate (about 90%), a hard foam material is obtained which has the following properties:

| | |
|---|---|
| Weight per unit volume, kg./m.³ | 37 |
| Compressive strength, kg./cm.² | 2.3 |
| Impact toughness, kg./cm. | 0.2 |
| Hot bending strength, ° C. | 121 |
| Water absorption, vol. percent | 5 |

Example 16

About 30.0 parts of polyhydroxyl compound B are thoroughly stirred with 70.0 parts of a propoxylated trimethylol propane (OH number about 380), about 2.0 parts of dimethylamino ethyl piperazine and about 0.5 part of polysiloxane polyalkylene glycol ester. After adding a mixture of about 91.0 parts diphenylmethane-4,4′-diisocyanate (about 90%) and about 30.0 parts of trichlorofluoromethane, a foam material is obtained having the following properties:

| | |
|---|---|
| Weight per unit volume, kg./m.³ | 34 |
| Compressive strength, kg./cm.² | 2.4 |
| Impact toughness, kg./cm. | 0.8 |
| Hot bending strength, ° C. | 81 |
| Water absorption, vol. percent | 5 |

Example 17

About 50.0 parts of polyhydroxyl compound C are mixed with about 50.0 parts of a polyester of phthalic acid anhydride, adipic acid, oleic acid and trimethylol propane (OH number about 380) and about 0.5 part of polysiloxane polyalkylene glycol ester. After adding about 93.0 parts of diphenylmethane-4,4′-diisocyanate (about 90%) and about 30.0 parts of trichlorofluoromethane, the mixture is introduced into molds, in which there is formed a hard foam material with the following mechanical properties:

| | |
|---|---|
| Weight per unit volume, kg./m.³ | 30 |
| Compressive strength, kg./cm.² | 2.6 |
| Impact toughness, kg./cm. | 0.3 |
| Hot bending strength, ° C. | 118 |
| Water absorption, vol. percent | 4 |

Example 18

About 25.0 parts by weight of polyhydroxyl compound D are mixed with 75.0 parts of a propoxylated trimethylol propane (OH number about 380), about 1.5 parts of ethyl morpholine, about 0.3 part of polysiloxane polyalkylene glycol ester and about 6.0 parts of sodium-castor oil sulphate (about 50% water). After incorporating about 149.0 parts of diphenylmethane-4,4′-diisocyanate (about 90%) by stirring, the mixture starts to foam and a foam material is obtained which has the following physical properties:

| | |
|---|---|
| Weight per unit volume, kg./m.³ | 36 |
| Compressive strength, kg./cm.² | 2.1 |
| Impact toughness, kg./cm. | 0.3 |
| Hot bending strength, ° C. | 127 |
| Water absorption, vol. percent | 3 |

In the foregoing working examples, the specific polysiloxane polyalkylene glycol ester used in every case is the compound having the formula:

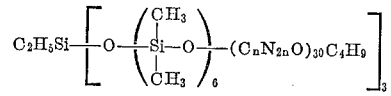

wherein $(C_nH_{2n}O)$ is a mixed polyoxyethylene and oxypropylene block copolymer containing about 17 oxyethylene units and about 13 oxypropylene units.

In the foregoing working examples the specific diphenylmethane 4,4′-diisocyanate (about 90%) in every case is the crude reaction product obtained by phosgenating the reaction product of aniline with formaldehyde under acid conditions, the resulting crude mixture of organic polyisocyanates containing 90 percent diisocyanate and the balance higher polyisocyanates.

It is also to be understood that the foregoing working examples are given for the purpose of illustration and that, if the teachings of this disclosure are followed, any other suitable ethylenically unsaturated compound, nitrile, aminonitrile, organic polyisocyanate, stabilizer, polyol or the like may be used.

Although the invention has been described in considerable detail in the foregoing, it is to be understood that such detail is solely for the purpose of illustration and that many variations can be made by those skilled in the art without departing from the spirit of the invention and the scope of the invention except as set forth in the claims.

What is claimed is:

1. A polyurethane plastic prepared by a process which comprises reacting an organic polyisocyanate with a polyol prepared by a process which comprises reacting an ethylenically unsaturated compound having a molecular weight of from about 28 to about 250 with ammonia, an organic polyamine or a hydrazine where the organic polyamine or hydrazine has at least 3 hydrogen atoms bonded to nitrogen atoms in the proportion of 0.1 to $n-2$ mols of ethylenically unsaturated compound per mol of ammonia, organic polyamine or a hydrazine and then reacting the resulting product with an alkylene oxide to prepare said polyol, $n$ being at least 3 and corresponding to the number of hydrogen atoms bonded to nitrogen in the ammonia, organic polyamine or a hydrazine, the reaction between the ethylenically unsaturated compound and the ammonia, organic polyamine or a hydrazine being carried out at a temperature of 0 to 100° C., said hydrazine having the formula $RHN—NH_2$ wherein R is hydrogen, alkyl, aryl or a hetrocyclic radical, said polyol having an hydroxyl number of from about 30 to about 750.

2. The polyurethane plastic of claim 1 wherein a blowing agent is included for the reaction between the organic polyisocyanate and the polyol to obtain a cellular polyurethane plastic.

3. The polyurethane plastic of claim 1 wherein a halohydrocarbon blowing agent is included to prepare a cellular polyurethane plastic.

4. The polyurethane plastic of claim 1 wherein said polyol has a hydroxyl number of from about 30 to about 750 and a blowing agent is included for the reaction between the organic polyisocyanate and the polyol in order to prepare a cellular polyurethane plastic.

5. The polyurethane plastic of claim 1 wherein said alkylene oxide is propylene oxide.

6. The polyurethane plastic of claim 1 wherein said ethylenically unsaturated compound is acrylonitrile, said organic polyamine is ethylene diamine and said alkylene oxide is propylene oxide.

References Cited by the Examiner

UNITED STATES PATENTS

| 1,992,615 | 2/1935 | Hoffmann | 260—465.5 |
|---|---|---|---|
| 3,075,927 | 1/1963 | Lanham | 260—2.5 |
| 3,087,901 | 4/1963 | Brown | 260—2.5 |
| 3,157,689 | 11/1964 | Rogier | 260—465.5 |

OTHER REFERENCES

"The Chemistry of Acrylonitrile," 2nd ed. Copyright 1959, pages 22, 23 and 24; American Cyanamide Company Petrochemicals Dept., New York.

LEON J. BERCOVITZ, *Primary Examiner.*

DONALD E. CZAJA, *Examiner.*